(12) United States Patent
Dobschal et al.

(10) Patent No.: US 9,134,535 B2
(45) Date of Patent: Sep. 15, 2015

(54) DISPLAY DEVICE HAVING A HOLDING DEVICE THAT CAN BE PLACED ON THE HEAD OF A USER

(75) Inventors: Hans-Jürgen Dobschal, Kleinromstedt (DE); Karsten Lindig, Erfurt (DE); Guenter Rudolph, Jena (DE)

(73) Assignee: Carl Zeiss AG, Oberkochen (DE)

( * ) Notice: Subject to any disclaimer, the term of this patent is extended or adjusted under 35 U.S.C. 154(b) by 109 days.

(21) Appl. No.: 13/823,720

(22) PCT Filed: Jul. 21, 2011

(86) PCT No.: PCT/EP2011/062528
§ 371 (c)(1),
(2), (4) Date: May 5, 2013

(87) PCT Pub. No.: WO2012/034750
PCT Pub. Date: Mar. 22, 2012

(65) Prior Publication Data
US 2013/0215516 A1      Aug. 22, 2013

(30) Foreign Application Priority Data

Sep. 17, 2010   (DE) .......................... 10 2010 040 962

(51) Int. Cl.
*G02B 27/14*      (2006.01)
*G03H 1/00*       (2006.01)
(Continued)

(52) U.S. Cl.
CPC ........ *G02B 27/0101* (2013.01); *G02B 27/0172* (2013.01); *G02B 3/08* (2013.01); *G02B 6/00* (2013.01); *G02B 2027/011* (2013.01); *G02B 2027/0178* (2013.01)

(58) Field of Classification Search
CPC ........... G02B 27/0172; G02B 27/0149; G02B 27/145; G02B 27/143; G02B 27/0025; G02B 27/144; G02B 27/013; G02B 23/02; G02B 23/18; G02B 5/045; G02B 27/0103; G02B 17/08

USPC ....... 359/630–634, 13–14; 349/11; 310/49 R, 310/156.32, 156.33, 156.34, 156.35, 310/266–268, 156.02; 353/11–12, 28, 119; 345/7, 9; 340/438, 980, 995.1, 815.47, 340/815.74; 351/200, 205–206, 210, 221
See application file for complete search history.

(56) References Cited

U.S. PATENT DOCUMENTS

| | | | |
|---|---|---|---|
| 5,153,778 A | | 10/1992 | Sasian-Alvarado |
| 5,446,594 A | * | 8/1995 | Nelson et al. ................. 359/742 |
| 6,963,379 B2 | * | 11/2005 | Tomono ......................... 349/11 |
| 7,656,585 B1 | * | 2/2010 | Powell et al. ................. 359/630 |

(Continued)

OTHER PUBLICATIONS

International Preliminary Report on Patentability, with English Translation, for PCT/EP2011/062528, Mar. 28, 2013, 15 pages total.

*Primary Examiner* — Dawayne A Pinkney
(74) *Attorney, Agent, or Firm* — Skaar Ulbrich Macari, P.A.

(57) ABSTRACT

A display device includes a holding device that can be placed on the head of a user. An image-generating module and an imaging lens system can be secured on the holding device. The latter includes a spectacle lens with a curved front and a curved back. It projects the image generated when the holding device is placed on the head such that the user can perceive it superimposed on the surroundings. Light from the image-generating module is coupled into an optical channel in the spectacle lens. It is conducted in the optical channel to an exit section and coupled via the exit section out of the spectacle lens. The optical channel includes in the region of the front and back a Fresnel structure with a plurality of facets on which the light conducted in the optical channel is reflected, and which are aligned parallel to one another.

12 Claims, 4 Drawing Sheets

(51) Int. Cl.
   *G02F 1/1335* (2006.01)
   *G03B 21/00* (2006.01)
   *G09G 5/00* (2006.01)
   *B60Q 1/00* (2006.01)
   *A61B 3/00* (2006.01)
   *G02B 27/01* (2006.01)
   *G02B 3/08* (2006.01)
   *G02B 6/00* (2006.01)

(56) References Cited

U.S. PATENT DOCUMENTS

2010/0134534 A1 6/2010 Seesselberg et al.
2010/0164860 A1 7/2010 Misono
2012/0001833 A1 1/2012 Lindig et al.
2012/0002294 A1 1/2012 Dobschal et al.
2012/0002295 A1 1/2012 Dobschal et al.

* cited by examiner

DISPLAY DEVICE HAVING A HOLDING DEVICE THAT CAN BE PLACED ON THE HEAD OF A USER

PRIORITY

This application claims the benefit of International Application PCT/EP2011/062528 filed on Jul. 21, 2011, and German Patent Application No. 102010040962.6, filed on Sep. 17, 2010, both of which are hereby incorporated herein by reference in their entirety.

FIELD

The present invention relates to a display device having a holding device that can be placed on the head of a user according to the preamble of claim 1.

BACKGROUND

A fundamental difficulty with such display devices is that of superimposing the normal beam path from the surroundings with the beam path of the light of the image generated by the image-generating module and conveying it to the eye of the user who is wearing the display device on his head. The beam path of the light of the generated image considered on its own represents an eyepiece, which projects the image information of the image-generating module into the eye. Now if the eyepiece is designed such that an image field that is as large as possible is obtained with a large exit pupil at the same time, this requires the use of deflecting elements in the form of mirrors or prisms. These additional deflecting elements increase the weight and volume of the complete display device, which for example significantly limits wearing comfort.

The curvature of the front and back of the spectacle lens leads to the further difficulty that large image errors arise during conduction in the optical channel, which must be compensated for.

SUMMARY

Starting from this, the object of the invention is to further develop a display device of the type named at the beginning such that the generated image is presented to the user with the fewest possible imaging errors, and at the same time the display device is designed to be small and compact.

The object is achieved, with a display device of the type named at the beginning, in that the optical channel has, in the region of the front and back, in each case a Fresnel structure with a plurality of facets, on which the light conducted in the optical channel is reflected and which are aligned parallel to one another.

Because the facets are aligned parallel to one another (the facets of the Fresnel structure on the front are aligned parallel to the facets of the Fresnel structure on the back), the optical channel acts optically as a plane-parallel plate, with the result that the imaging errors otherwise caused by the curvature of the front and back can be effectively prevented. The facets of the two Fresnel structures virtually cancel out the effect of the curved front and back of the spectacle lens.

In the display device, the entrance section on the front of the spectacle lens can have a third Fresnel structure with third facets, which are aligned parallel to one another and are tilted relative to the first and second facets. The tilt of the third facets is preferably selected such that the light reflected on the third facets is thus coupled into the optical channel and can be conducted therein.

The third Fresnel structure can be designed such that it only brings about a bending of the beam path and does not have an imaging property. It is, however, also possible that the third Fresnel structure brings about a bending of the beam path and at the same time has an imaging property. The imaging property can in particular be a collimation effect. The imaging lens system can therefore be of very compact design overall. In particular, the imaging lens system can be realized by the spectacle lens alone.

Furthermore, in the display device according to the invention, the exit section on the front of the spectacle lens can have a fourth Fresnel structure with fourth facets, which are aligned parallel to one another and are tilted relative to the first and second facets. The fourth facets are, in particular, tilted such that the light coming from the optical channel and reflected on the fourth facets travels perpendicular to the facets of the first and second Fresnel structure.

The Fresnel structure on the back of the spectacle lens can extend as far as the entrance section and/or exit section. This is advantageous in that in this region too, the back acts for the light like the side of a plane-parallel plate.

In the display device according to the invention, the fourth facets can either form a continuous saw-tooth structure or be arranged at a distance from one another. In particular, the fourth facets can be coated with a partially reflecting layer. The partially reflecting layer can be for example a metal layer or an interference layer.

Furthermore, the fourth facets can be filled with a material that has the same or a similar refractive index as the spectacle lens, such that the front of the spectacle lens is flat in the filled regions. Preferably the flat side with filling is parallel to the facets of the Fresnel structure on the back of the spectacle lens. It is, however, also possible for the filling to be carried out such that in the filled region the original curvature of the spectacle lens is produced again.

In the display device according to the invention, the light is conducted in the optical channel preferably by total internal reflection.

The facets of the Fresnel structures are preferably of flat design. The step height of the facets is preferably in the range from 20 µm to 300 µm.

The image-generating module can have an image transmitter, preferably a flat image transmitter, which can be self-illuminating or non-self-illuminating. In particular, the image transmitter can be designed as tilting mirror matrix, as LCD module, as LCoS module or as OLED module. Furthermore, the image-generating module can also have a control unit for controlling the image transmitter.

The imaging lens system can have a collimating lens system, which is arranged between the image-generating module and the spectacle lens. The collimating lens system can for example be realized by a single lens. The single lens can be designed as a planoconvex lens, wherein preferably the flat side faces the image transmitter. The convex side can have spherical or also aspherical curvature.

Naturally, it is possible for the collimating lens system to have more than one individual lens.

Furthermore, the third Fresnel structure can be designed such that its imaging property replaces the effect of the collimating lens system. In this case the separate collimating lens system or the separate lens can be omitted.

The display device according to the invention can have a second spectacle lens, which is designed in the same way as the first spectacle lens, and a second image-generating module, which is designed like the first image-generating module. In this case it is possible for the generated image to be presented to the user for example as a three-dimensional image.

Furthermore, the display device according to the invention can have still further elements that are known to a person skilled in the art, which are necessary for operation of the display device.

It is understood that the features mentioned above and those yet to be explained below can be used, not only in the stated combinations, but also in other combinations or alone, without departing from the scope of the present invention.

BRIEF DESCRIPTION OF THE DRAWINGS

The invention is explained in further detail below by way of example below using the attached drawings, which also disclose features essential to the invention. There are shown in.

DETAILED DESCRIPTION

Figure 1:
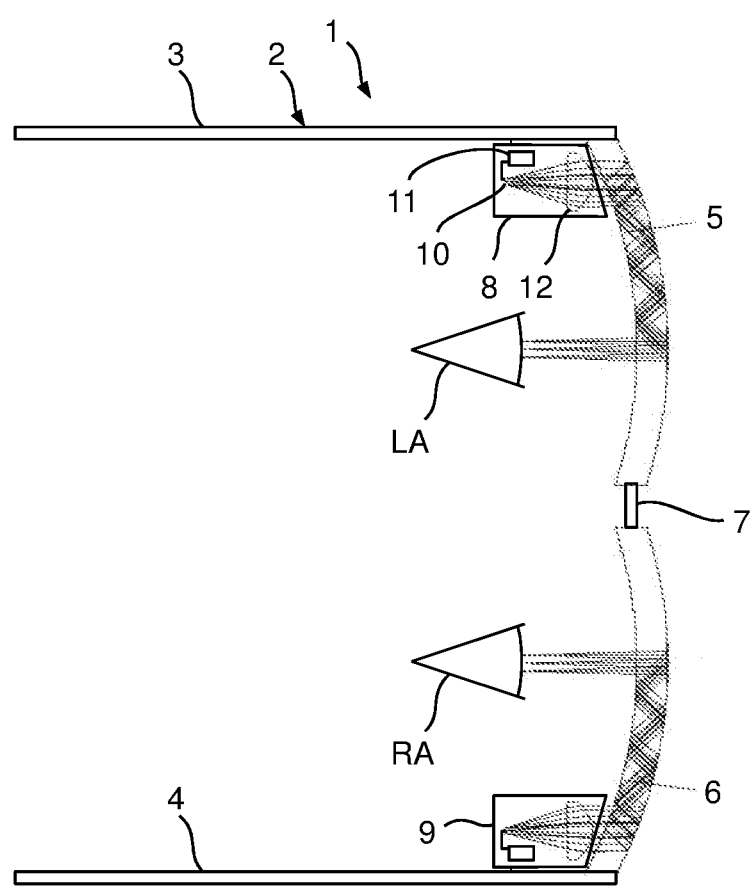
FIG. 1 a schematic top view of a first embodiment of the display device according to the invention.

In the embodiment shown in top view in FIG. 1, the display device 1 according to the invention comprises a holding device 2, mountable on the head of a user, with two spectacle-like side arms 3, 4, two spectacle lenses 5, 6 (one for the left eye LA and one for the right eye RA) and a bridge 7 connecting the two spectacle lenses 5, 6.

Furthermore, for each of the user's eyes, an image-generating module 8, 9 is provided, which can be secured on the respective side arm 3, 4 or also on the respective spectacle lens 5, 6. As the design of the spectacle lenses 5, 6 and the design of the image-generating modules 8, 9 essentially have mirror symmetry relative to an axis running parallel to the side arms 3 through the bridge 7, only the spectacle lens 5 for the user's left eye LA and the associated image-generating module 8 will be described in detail below.

Figure 2:
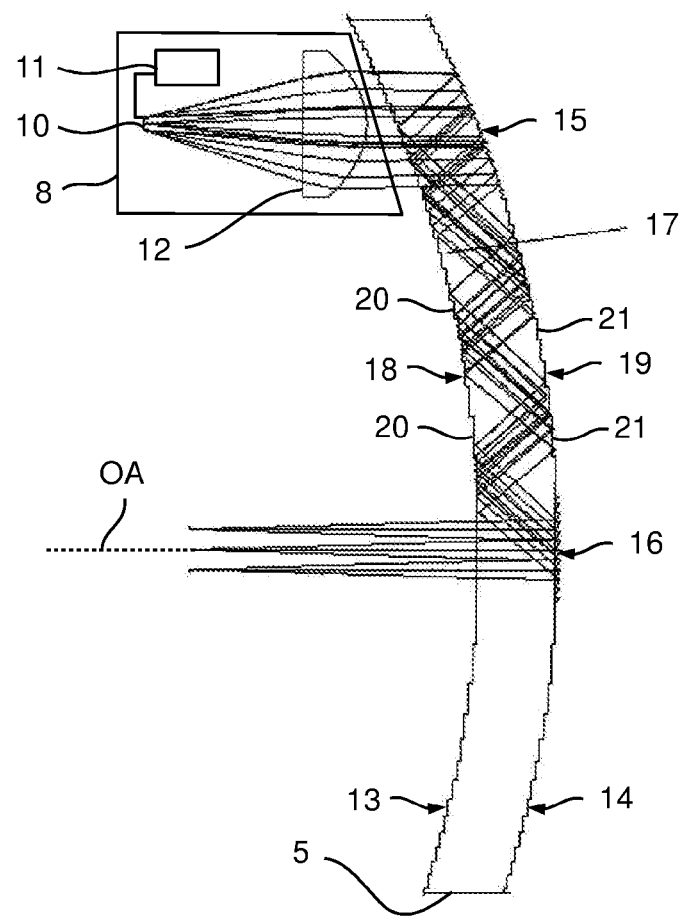
FIG. 2 an enlarged representation of the first spectacle lens and of the associated image-generating module.

In FIG. 2, the left spectacle lens 5 and the image-generating module 8 are shown enlarged, in the same view as in FIG. 1.

The image-generating module 8 comprises a flat image transmitter 10 (here an OLED or an LCD image transmitter) and a control unit 11, which controls the image transmitter 10 for generating an image.

The image-generating module 8 furthermore contains a collimating lens system 12, arranged after the image transmitter 10, which is designed here as a planoconvex lens, wherein the flat side faces the image transmitter 10 and the convex side has aspherical curvature.

The collimated light coming from the collimating lens system enters the left spectacle lens 5 via the curved back 13 of the latter, travels to the curved front 14 and is there reflected back, in a first region 15, to the back 13.

As can be seen from the beam path shown in FIG. 2, several bendings of the beam path occur on the back 13 and the front 14 and the light is thus conducted to a second region 16 of the front 14. The light is reflected on the second region 16 such that it travels through the back 13 and thus exits the spectacle lens 5 and impinges on the user's eye LA, with the result that the user can perceive the image presented by means of the image transmitter 10. The left eye LA is not shown in FIG. 3.

The region in the spectacle lens 5 in which the light is conducted from the first to the second region 15 and 16 can be designated as the optical channel 17. In the region of the optical channel 17, a first Fresnel structure 18 is formed on the back 13 and a second Fresnel structure 19 is formed on the front 14 of the spectacle lens 5, wherein the facets 20, 21 of the two Fresnel structures 18, 19 are aligned parallel to one another (in FIG. 2, for greater clarity, only some of the facets 20, 21 are designated with the respective reference symbols).

Figure 3:
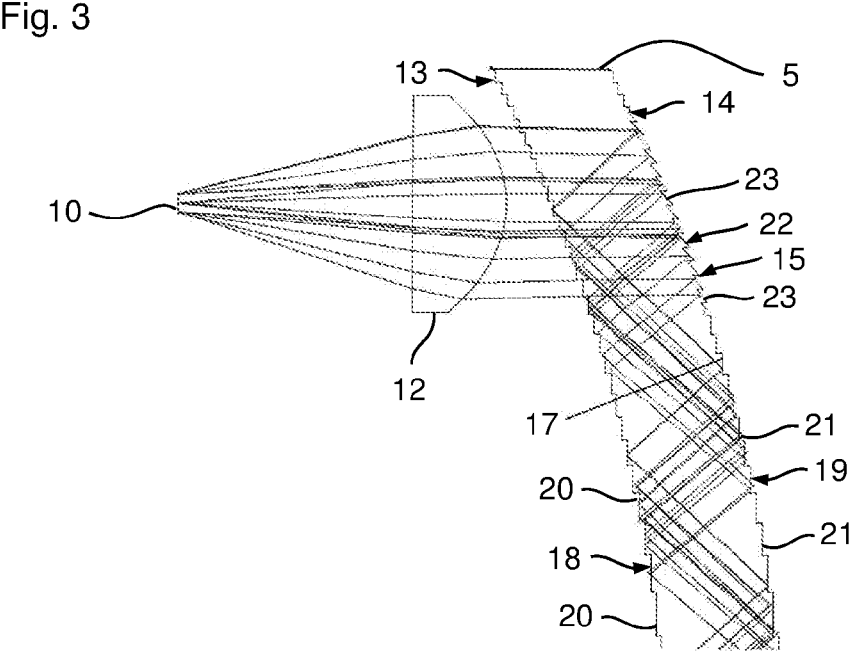
FIG. 3 an enlarged representation of an extract from FIG. 2.

In the embodiment described, the facets 20, 21 are perpendicular to the optical axis OA, with the result that owing to the curvature of the front and back 13, 14 in each case a staircase-like structure is formed, as can be seen e.g. in FIG. 2 and in the enlarged view of the first region and of a part of the Fresnel structures 18, 19 in FIG. 3. The sizes of the facets 18, 19 are preferably selected such that the step height of the staircase-like structures is in the range from 20 μm to 300 μm.

As a result of this structure, advantageously the spectacle lens 5, in the region of the optical channel 17, corresponds optically to a simple flat plate. Thus the Fresnel structures 18 and 19 in the region of the light channel 17 cancel out the effect of the curved back 13 and of the curved front 14. The reflection on the facets 20, 21 preferably takes place by total internal reflection.

As can furthermore be seen from the representation in FIGS. 2 and 3, the first Fresnel structure 18 also extends into the region of the back 13, via which the collimated light of the collimating lens system 12 enters the spectacle lens 5, with the result that on entrance via the back 13 there is no undesired imaging effect for the collimated light, as the facets 20 of the first Fresnel structure 18 are perpendicular to the direction of propagation of the collimated light.

As can furthermore be seen in particular from FIG. 3, in the first region 15 on the front 14, a third Fresnel structure 22 is formed, the facets 23 of which are all tilted by −30° and are aligned parallel to one another. The third Fresnel structure 22 thus brings about the desired deflection towards the back 13, with the result that the light rays are then reflected to and fro between front and back owing to the first and second Fresnel structure 18 and 19 in the same way as with a flat plate.

Figure 4:
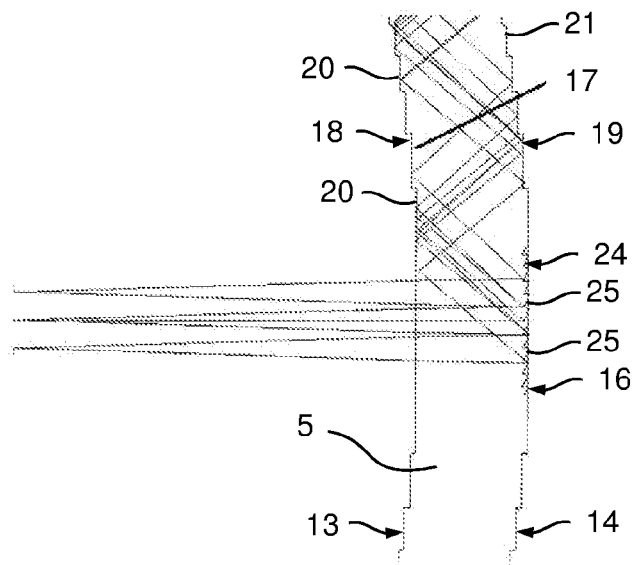
FIG. 4 an enlarged representation of a section of FIG. 2.

FIG. 4 shows an enlarged view of the second region 16 of the spectacle lens 5. In the second region 16, a fourth Fresnel structure 24 with facets 25 is formed, wherein the facets 25 here are tilted by +30°, with the result that the light rays impinging on them, after reflection, travel parallel to the optical axis OA and thus perpendicular to the facets 20 of the first Fresnel structure 18. As a result, the light rays can emerge from the spectacle lens 5 and travel to the user's left eye LA.

Figure 5:
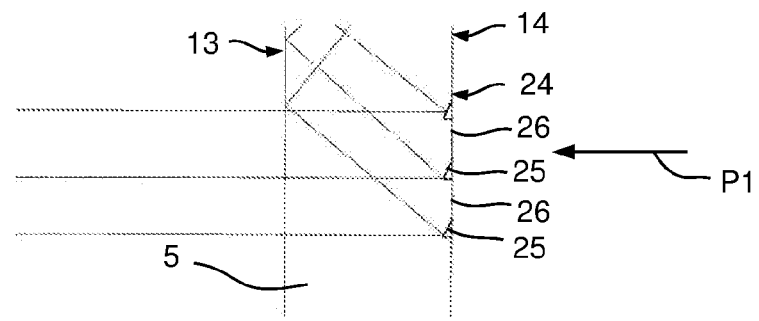
FIG. 5 an enlarged representation of the fourth Fresnel structure.

As can be seen from the enlarged representation in FIG. 5 of three facets 25 of the fourth Fresnel structure 24, the facets 25 can be at a distance from one another, wherein the in-between regions 26 are either designed as flat regions or have the original curvature of the front 14. Thus, through the in-between regions 26, ambient light, as indicated by the arrow P1, can enter the spectacle lens 5 via the front 14 and re-emerge from the back 13, whereby the user can perceive the image generated by the image transmitter 10 superimposed on the surroundings.

Figure 6:
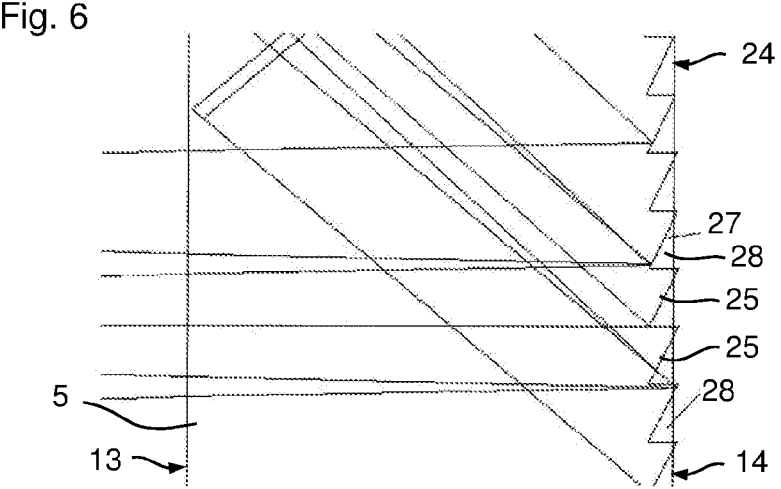
FIG. 6 an enlarged representation of an alternative design of the fourth Fresnel structure, and FIG. 7 a schematic representation of the spectacle lens plus associated imaging lens system of a further embodiment of the display device according to the invention.

In an alternative design, shown in FIG. 6, the facets 25 can be placed next to one another without spacing. In this case the facets are preferably coated with a thin metal layer 27, with the result that they are partially reflective or partially transparent. The metal layer 27 can be designed such that it transmits for example 70% to 90% of the ambient light and reflects 10% to 30% of the light from the optical channel 17.

As can furthermore be seen from FIG. 6, a material 28, which has the same or almost the same refractive index as the spectacle lens 5, can be applied to the metal layer 27. The filling with the material 28 can in particular be such that the front 14 is flat, with the result that the ambient light can pass through the spectacle lens unaffected. Naturally, the front can also have a curvature which corresponds to the original curvature of the front 14 of the spectacle lens. The same filling with the material 28 can be carried out for the facets 25 of the embodiment in FIG. 5.

Instead of the metal layer 27, it is also possible to use an interference layer.

The described design of the first, second and fourth Fresnel structures 18, 19 and 24 thus offers the advantage that, both for the ambient light and for the light coupled-in by the image transmitter 10, the spectacle lens 5 behaves optically as a plane-parallel plate, although the Fresnel structures 18, 19 and 24 are formed on the front or back 14, 13 of greater or lesser curvature. Thus, advantageously, regardless of the shape of the spectacle lens, no additional image error is generated on conduction of the light rays in the optical channel 17, which makes considerable simplification of the whole optical system possible.

Moreover, as a result, imaging of high quality can be achieved even with curved spectacle lenses 5, 6.

Furthermore, it can advantageously also be achieved that a so-called beam expander can be produced at the same time. This means that light rays that impinge and are reflected on the perpendicular facets 21 on the front 14, are totally reflected on the facets 20 and impinge a second time on the front 14, wherein here they either impinge on one of the inclined facets 25 of the fourth Fresnel structure 24 and are coupled out or impinge a second time on one of the perpendicular facets 21 and once again are totally reflected. Thus with the display device 1 according to the invention, the condition that usually has to be fulfilled with Fresnel structures, that the light must not travel twice via the same Fresnel structure, need not be observed, whereby very thin spectacle lens thicknesses are possible and at the same time a large field of view and a large out-coupling pupil can be achieved.

Figure 7:
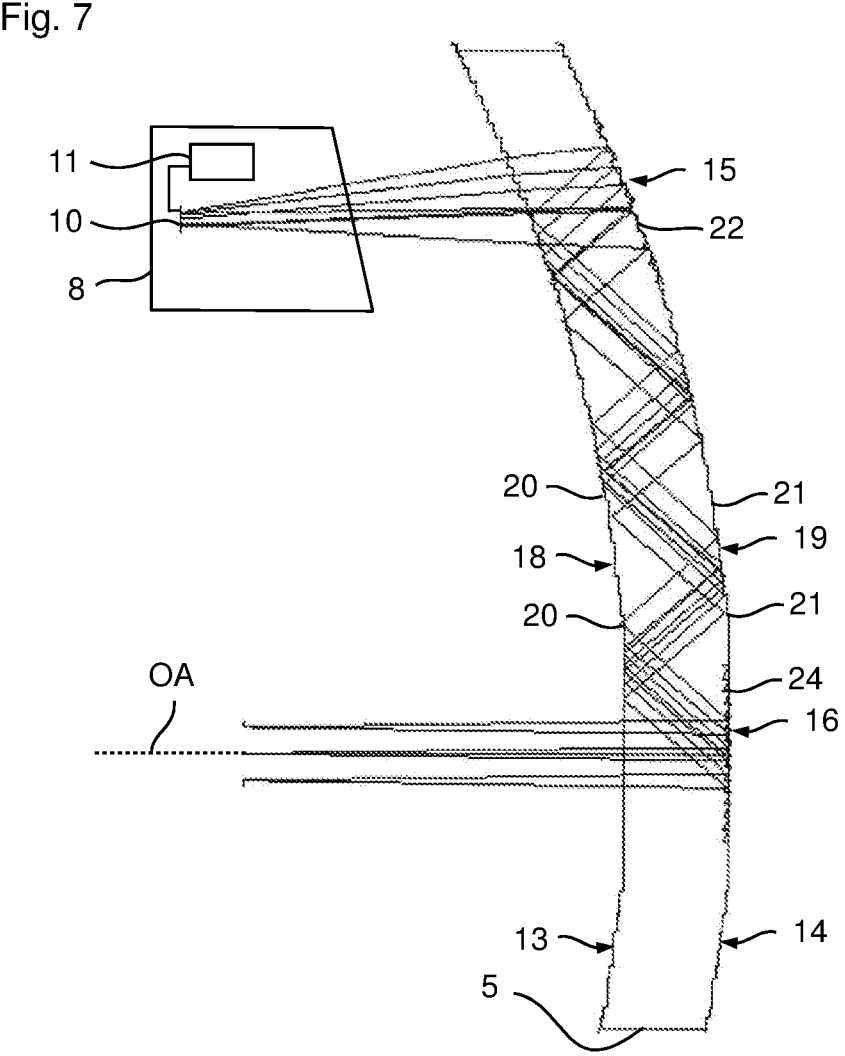

FIG. 7 shows a modification of the spectacle lens 5 plus image-generating module 8. In the embodiment examples described so far in connection with FIGS. 1-6, all Fresnel structures 18, 19, 22 and 24 are designed such that they bring about a bending of the beam path without imaging. In each case they act virtually as a plane mirror.

In the modification according to FIG. 7, in contrast to the embodiment examples described so far, the third Fresnel structure 22 is designed such that it not only brings about a bending of the beam path, but also it additionally achieves an imaging function. However, this is realized without diffraction effects. The third Fresnel structure 22 acts virtually as a mirror with curved reflecting surface. The facets 23 of the third Fresnel structure 22 themselves are once again designed flat.

When the third Fresnel structure 22 has the described imaging property, the separate collimating lens system 12 is no longer required, with the result that the display device 1 can be designed to be even more compact and lighter.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display device, comprising:
a holding device configured to be placed on the head of a user;
an image-generating module, secured on the holding device, configured to generate an image; and
an imaging lens system, secured on the holding device, which includes a spectacle lens with a curved front and a curved back, and which is configured to project the image generated when the holding device is placed on the head such that the user can perceive it superimposed on the surroundings,
wherein the light coming from the image-generating module is coupled via an entrance section into an optical channel in the spectacle lens, conducted in the optical channel to an exit section and coupled via the exit section out of the spectacle lens,
wherein the optical channel includes, in a region of the curved front and the curved back, in each case, a first and a second Fresnel structure with a first facet and a second facet, on which the light conducted in the optical channel is reflected, and which are aligned parallel to one another,
wherein owing to the first and second facets, the optical channel acts optically as a plane-parallel plate, and
wherein the first facets are formed on the back of the spectacle lens and the second facets are formed on the front of the spectacle lens.

2. The display device according to claim 1, wherein the entrance section includes, on the front of the spectacle lens, a third Fresnel structure with third facets, which are aligned parallel to one another and are tilted relative to the first and second facets.

3. The display device according to claim 2, wherein the third Fresnel structure only brings about a bending of the beam path and does not have an imaging property.

4. The display device according to claim 2, wherein the third Fresnel structure brings about a bending of the beam path and at the same time has an imaging property.

5. The display device according to claim 1, wherein the exit section on the front of the spectacle lens includes a third Fresnel structure with third facets, which are aligned parallel to one another and are tilted relative to the first and second facets.

6. The display device according to claim 5, wherein the third Fresnel structure only brings about a bending of the beam path and does not have an imaging property.

7. The display device according to claim 5, wherein the third facets form a continuous saw-tooth structure.

8. The display device according to claim 5, wherein the third facets are arranged at a distance from one another.

9. The display device according to claim 5, wherein the third facets are coated with a partially reflecting layer.

10. The display device according to claim 1, wherein the light is conducted in the optical channel by total internal reflection.

11. The display device according to claim 1, wherein the image-generating module includes an image transmitter and a collimating lens system arranged after the image transmitter.

12. The display device according to claim 1, wherein the first and second facets of the first and second Fresnel structures virtually cancel out the effect of the curved front and the curved back of the spectacle lens.

* * * * *